Patented July 14, 1953

2,645,632

UNITED STATES PATENT OFFICE 2,645,632

RESINOUS COPOLYMERS OF NUCLEARLY POLYSUBSTITUTED ISOPROPENYL BENZENES

Theodore A. Te Grotenhuis, Olmsted Falls, and Gilbert H. Swart, Akron, Ohio, assignors to The General Tire and Rubber Company, Akron, Ohio, a corporation of Ohio No Drawing. Application February 23, 1950, Serial No. 145,902

21 Claims. (Cl. 260—80.7)

This application is a continuation-in-part of our copending application Serial No. 667,728, filed May 6, 1946, and the invention relates to resinous copolymers comprising nuclearly polysubstituted isopropenylbenzenes and to a method of preparing such copolymers. It particularly relates to thermoplastic resinous materials having high heat distortion and containing a plurality of nuclear substituents, at least one of which is a halogen, such as chlorine, fluorine, bromine, etc.

Inasmuch as a main phase of the present invention deals with the outstanding results obtained by copolymerizing two of the thirty next higher homologues of dichlorostyrene, it is thought that the present invention is clarified by (1) considering the defects or difficulties which have been encountered with the dichlorostyrenes, (2) by comparing the properties relative to homopolymerization and copolymerization with mono-olefines such as styrene of (a) the various isomeric dichlorostyrenes, (b) alpha-methylstyrene, and (c) the thirty isomers of dichloro-alpha-methylstyrene (all of which are next higher homologues of dichlorostyrene).

It is known that dichlorostyrenes such as the 1-vinyl-2,4-dichlorobenzene and the 1-vinyl-2,5-dichlorobenzene, and others may be polymerized and copolymerized to produce rubbers or resins having especially desirable properties. Thus, the rubbery copolymer of one or more butadiene compounds and a mixture of the isomers of dichlorostyrene has properties in several respects superior to those of natural rubber for tire treads and the like.

There are, for example, at least six isomeric dichlorostyrenes having the same empirical formula and having both chlorine atoms on the benzene ring. All six of these isomeric dichlorostyrenes homopolymerize, i. e. polymerize with themselves with extreme rapidity. In fact, they are so extremely active compared to styrene that great difficulty is experienced in handling and preparing them. A substantial amount of inhibitor must be present during their preparation and storage and they should be stored at relatively low temperature at all times prior to use. The result of this extreme activity toward polymerization renders their preparation and the preparation of copolymerization products relatively more expensive than would otherwise be the case.

Alpha-methylstyrene on the other hand forms copolymers with many monomers but unlike styrene and any of the dichlorostyrenes it has little tendency for homopolymerization.

Each of the six isomeric dichlorostyrenes has at least five next higher homologues, each of which has the same empirical formula which differs from that of dichlorostyrene only in that it has a —CH₃ group in place of a hydrogen of the dichlorostyrene. It is recognized that there was a period in chemical history when it was considered that a single member of a homologous series indicated the properties of the higher members of the series. While such may be true of the simplest aliphatic compounds, it is now recognized that in more complex molecules the properties of a lower homologue not only do not necessarily indicate the properties of all next higher homologues but may actually indicate false and misleading properties. The error of drawing conclusions based on the properties of the lower homologue is here illustrated particularly as to homopolymerization and as to copolymerization with certain classes of mono-olefines.

While most of these thirty isomeric homologues also have properties similar to the dichlorostyrenes, two homologues of each, namely, those having methyl groups in the alpha or beta position, are not only not as highly reactive toward homopolymerization as are the dichlorostyrenes but have no appreciable or noticeable tendency to homopolymerize by free radical mechanisms. Furthermore, 10 of these 12 next higher homologues of dichlorostyrene are apparently inert to copolymerization by free radical mechanisms with the more desirable resin forming mono-olefines such as styrene, etc., such as described herein.

It was the stated opinion of others who, prior to the present invention, had investigated homopolymerization and copolymerization of dichloro-alpha-methylstyrenes prepared by a process analogous to that used commercially for preparing dichlorostyrenes, that all 12 of these structurally closely related materials were inert to copolymerization with mono-olefines.

Most of the dichloro-alpha-methylstyrenes also have properties unlike those of alpha-methylstyrene itself. Alpha-methylstyrene, as is well known, copolymerizes with various materials including styrene and many other mono-olefines to produce desirable polymerization products. The inert behavior of the dichloro-alpha-methylstyrene prepared and tested for copolymerization with styrene prior to the present invention indicated that all of the dichloro-alpha-methylstyrenes also differed radically as to copolymerizability not only from dichlorostyrene but from alpha-methylstyrene as well.

A main phase of the present invention is based on the discovery that the two isomers of dichloro-alpha-methylstyrene having chlorine or substituents on the 3,4- or 3,5-positions act very differently from the majority of dichloro-alpha-methylstyrenes in that they copolymerize with a certain class of mono-olefinic compounds to form highly desirable resins.

As aforeindicated we have found that two of the dichloro-alpha-methylstyrenes, namely, the 3,4- and 3,5- copolymerize with desirable mono-olefines such as styrene and others as hereinafter described. Neither of the dichloro-alpha-methylstyrenes are prepared in a manner analogous to the method commercially used for the preparation of the dichlorostyrenes, i. e. by subjecting cumene (in place of the ethyl benzene) successively to nuclear chlorination, to side-chain chlorination, and subsequent side-chain dehydrochlorination. Such polychloroalpha methyl-styrenes consist largely of isomers having chlorine in the positions adjacent the unsaturated side-chain (alkenyl group) and it is possible that they are thereby so sterically hindered that copolymerization with mono-olefines is prevented. In any event, we have been unable to polymerize or copolymerize (by the free radical mechanism) these materials with polymerizable olefinic monomeric materials to obtain desirable products, even though catalysts normally considered as suitable for initiating emulsion and mass polymerization at ordinary temperatures are present. That steric considerations may not be the explanation for the strange behavior of the many dichloro-alpha-methylstyrenes is indicated by our later surprising discovery that the two dichloro-alpha-methylstyrenes that do copolymerize with certain other mono-olefines also copolymerize with each other and with certain other alpha-methylstyrene derivatives.

The present invention is not limited to copolymers of 3,4- and 3,5-dichloro-alpha-methylstyrenes and styrene but is based on the broader discovery that a few of the many isomers of di- and tri-substituted alpha-methylstyrenes, act very differently than do most isomers of these materials in that they form exceptionally useful resinous coplymers with certain polymerizable monovinyl compounds such as styrene, methyl methacrylate and the like, whereas other isomers do not polymerize or copolymerize at all with such monovinyl compounds and give indications that the polysubstituents in the nucleus have rendered the alkylenyl group inert. The nuclearly di- and tri-substituted alpha-methylstyrenes, with which mono-olefinic compounds co-polymerize to produce useful resins as hereinafter described, have the following general formula

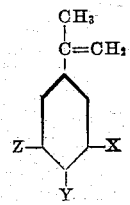

where "X" is selected from halogen, and methyl, "Y" and "Z" are selected from hydrogen, methyl and halogen, at least one of "Y" and "Z" being selected from methyl, and halogen and preferably one of "Y" and "Z" being hydrogen.

The present invention is particularly directed as hereinafter noted to the copolymers of certain hereinafter specified groups of monovinyl compounds having a general formula that is identical with the above but in which "Z" is hydrogen and "Y" is always selected from methyl and halogen. Halogen and methyl are as far as we have been able to determine the only ortho-para directing groups that do not appreciably activate the benzene ring. The other ortho-para directing groups, namely —OH, —OR and —NR₂, where R is hydrogen or alkyl, etc. highly activate the benzene ring and accordingly are undesirable. Halogen and especially chlorine constitutes the preferred substituents.

These alpha-alkylstyrenes include the 3,4-disubstituted alpha-methylstyrenes in which the nuclear substituents are selected from chlorine and methyl groups. These 3,4-disubstituted alpha-methylstyrenes include:

3,4-dichloro-alpha-methylstyrenes;
3,4-dimethyl-alpha-methylstyrenes;
3-chloro-4-methyl-alpha-methylstyrenes;
3-fluoro-4-methyl-alpha-methylstyrenes;
3-bromo-4-methyl-alpha-methylstyrenes;
3-methyl-4-chloro-alpha-methylstyrenes; and
3-methyl-4-fluoro-alpha-methylstyrenes.

All of these alpha-methylstyrenes in contrast to those having substituents at either the 2- or 6-positions are found to form resinous materials with desirable properties by copolymerization with resin-forming or polymerizable mono-olefinic compounds having monomer reactivity for copolymerization ("Q value") greater than that of vinylidene chloride and vinylchloride. "Q value" is defined in an article by Charles Price entitled "Some relative monomer reactivity factors," Journal of Polymer Science, vol. III, No. 5, pages 772–775. However, the disubstituted alpha-methylstyrenes, in which at least one of the substituents is halogen having an atomic weight no larger than bromine such as chlorine, bromine and fluorine, are found to have substantial advantages over the alpha-methylstyrenes in which both of the nuclear substitutents are methyl groups, or substituted methyl groups as hereinafter pointed out. Similarly, the disubstituted alpha-methylstyrenes in which both of the substituents are small halogen atoms such as flourine, chlorine and bromine (particularly chlorine) are found to have considerable advantage over those in which one or both of the substituents is a methyl group.

The compounds of the above general formula also include the 3,5-disubstituted alpha-methylstyrenes in which the nuclear substituents are selected from methyl, and halogen groups. These 3,5-disubstituted materials include:

3,5-dichloro-alpha-methylstyrenes;
3,5-difluoro-alpha-methylstyrenes;
3,5-dibromo-alpha-methylstyrenes;
3-chloro-5-methyl-alpha-methylstyrenes; and
3,5-dimethyl-alpha-methylstyrenes.

While the above nuclear substituted alpha-methylstyrenes in which only two substituents selected from chlorine and methyl groups are much preferred, and give polymers of excellent properties, it is also found that nuclear trisubstituted alpha-methylstyrenes also copolymerize with monoolefinic materials, as hereinafter qualified, to form resinous compositions, provided such trisubstituted alpha-methylstyrenes are devoid of substituents in the 2- and 6-positions. These tri-substituted alpha-methylstyrenes include:

3,4,5-trichloro-alpha-methylstyrenes;
3,4,5-tribromo-alpha-methylstyrenes;
3-methyl-4,5-dichloro-alpha-methylstyrenes;
3,5-dimethyl-4-chloro-alpha-methylstyrenes;
3,4-dimethyl-5-chloro-alpha-methylstyrenes;
4-methyl-3,5-dichloro - alpha - methylstyrenes; and
3,4,5-trimethyl-alpha-methylstyrenes.

It will be noted that the above members of the above general formula substituted alpha-alkylstyrenes found to copolymerize by free radical mechanism with mono-olefinic compounds having a monomer reactivity for copolymerization greater than that of vinylidene chloride are all characterized by being free of substituents in the nuclear positions ortho to the iso-alkylenyl group (the isopropenyl group). In other words, in compounds the copolymerization of which the present invention is concerned, the atoms adjacent to the one carrying the isopropenyl group are free of all substituents, i. e. are connected to hydrogen. We have been unable by any of the polymerization systems employing a free radical mechanism to copolymerize with any mono-olefinic compound a nuclearly disubstituted alpha-methylstyrene having a substituent in the 2- and/or 6-positions on the nucleus. Neither emulsion nor the mass procedures were effective although the same procedures i. e. identical except for the different isomer of disubstituted alpha-methylstyrene were very effective for 3,4- and 3,5-disubstituted isomers.

The 3,4-dichloro-alpha-methylstyrenes may be prepared by any suitable process, as for example by alkylation of an ortho-dihalobenzene, such as ortho-dichlorobenzene, with a propylating agent such as propylene, isopropyl alcohol, and isopropyl chloride in the presence of aluminum chloride and subsequent dehydrogenation of the dichlorocumene. This is described in detail in the Guido H. Stempel, Jr. application Serial No. 778,747, filed October 9, 1947, and assigned to the assignee of the present invention.

The 3,5-dichloro-alpha-methylstyrene may be prepared as described in the aforementioned copending application of Guido H. Stempel from 3,5-dichlorobenzoic acid by treating it with thionylchloride to give 3,5 - dichlorobenzoyl-chloride; reacting this product with methyl alcohol to form methyl 3,5-dichlorobenzoate; treating this ester with two equivalents of methyl magnesium chloride, hydrolyzing, and then dehydrating the resultant complex by refluxing it with sodium bisulfate. 3,5-dichloroisopropenylbenzene had a specific gravity of 1.196 and refractive index of 1.5660 both measured at 25° C.

A preparation of 3-methyl-4-chloroisopropenylbenzene is also described in the aforementioned application of Guido H. Stempel. Briefly the process comprises subjecting 3-methyl-4-chloroacetophenone to 4-molar methyl magnesium chloride in ether, pouring the reacted mixture over cracked ice containing concentrated hydrochloric acid to form the corresponding carbinol, and dehydrating the carbinol by heating it in the presence of sodium bisulfate. The 3-methyl-4-chloroisopropenylbenzene had a boiling point of 107 to 108° C. at 17 mm.; a refractive index (D line) of 1.5519 at 25° C.; and a $$d_{25}^{25}$$

of 1.055 g./ml.

3-chloro-4-methylisopropenylbenzene may be conveniently prepared as described in detail in Dr. Stempel's aforementioned application by oxidizing 2-chlorocymene dissolved in acetic acid with nitric acid to form 3-chloro-4-methyl benzoic acid; then after purification of this product first converting it into its ester by refluxing with methyl alcohol and concentrated sulfuric acid; then reacting this ester with 4-molar methyl magnesium bromide in ether; thereafter hydrolyzing the product with an ice-hydrochloric acid mixture to form the carbinol; and refluxing the carbinol with anhydrous potassium bisulfate. The 3 - chloro-4-methylisopropenylbenzene recovered by distillation boils at 80° C. at 3 mm. It has a refractive index D line at 25° C. of 1.5508.

3,4-dimethyl-alpha-methylstyrene may be prepared as more particularly described in the pending application of Guido H. Stempel, Serial No. 145,590, filed of even date hereof and assigned to the assignee hereof. In accordance with the process 3,4-dimethyl-acetophenone which is first prepared from ortho-oxylene and acetic anhydride is heated with methyl magnesium bromide, the product hydrolyzed to the carbinol and the carbinol dehydrated. The 3,4-dimethyl-alpha-methylstyrene boils at 86° C., freezes at −21° C. and has a refractive index $N_D^{25}$ of 1.5376. 3,5-dimethyl-alpha-methylstyrene is prepared in a similar way starting with meta-xylene.

Halogenated alpha-alkylstyrenes and the other di- and trisubstituted styrenes of the present invention as aforementioned for best results, such as highest heat distortion in the resinous copolymer, should be substantially free of alpha-alkylstyrenes having a substituent, such for example as chlorine, on the 2- and/or 6-positions of the nucleus. Such alpha-alkylstyrenes remain unpolymerized in the product, and small amounts adversely affect properties desired for most applications. However, such unpolymerizable alpha-alkylstyrenes may be present to remain as a plasticizer as they are usually compatible with the final resin. It is highly desirable that materials containing substituents in the 2- and 6-positions and other noncopolymerizable materials do not exceed 25 per cent of the total amount of halogenated alpha-methylstyrenes as they are usually very difficult to remove from resinous copolymers.

Copolymerization with styrene and other polymerizable mono-olefines especially those containing no oxygen and even homopolymerization of the 3,4- and 3,5-dichloro or disubstituted isopropenylbenzenes may be accomplished by the use of an ionic or acidic type catalyst such as those of the Friedel-Crafts type, say an aluminum chloride carbon disulfide or aluminum chloride methyl chlorine complex, or by boron fluoride or any of the usual boron trifluoride complexes such as the boron trifluoride ether complex at low temperatures such as below −40° C. and preferably below −80° C., employing techniques entirely analogous to those used for preparation of "Butyl" rubber. We have however, been unable to effectively polymerize or copolymerize even with such powerful catalysts as the 1-isopropenyl-2-chlorobenzenes and others containing substituents on the 2- and/or 6-positions.

In accordance with the present invention, resinous compositions are made by interpolymerizing any one or more alpha-alkylstyrenes of the above mentioned general formula and preferably one having a plurality of halogen atoms in the nucleus, i. e. attached to carbon atoms of the aryl group, but which do not contain substituents on the carbon next adjacent to that nuclear carbon atom directly carrying the olefine group, with one or more other polymerizable unsaturated compounds containing in any one aliphatic portion thereof but one activated ethylenic linkage, i. e. one olefine >C=C< group (including vinyl groups $CH_2=CH-$ and vinylidene groups, $$(CH_2=C-)$$

activated for vinyl polymerization by at least one activating group, such for example as aryl, —COOR in which R is hydrogen, alkyl, aryl, substituted alkyl, an amide group CONR¹ where R¹ is hydrogen or alkyl etc., acid anhydride and pyridyl groups. The activating group is attached directly to a free valence of an olefinic carbon to activate the double bond. The above compounds are preferably further characterized in that both of the free valences of a single carbon of the olefinic group are not simultaneously connected to electron-donor groups selected from aryl, alkyl, oxyalkyl and —OCOR groups and the compounds have no atoms other than C, H, N, Cl, Br and O in the molecule. Two such donor groups, on any one carbon of the olefinic group, appear to render copolymerization very difficult unless a monomer of a positive type, such for example as maleic anhydride, is also present with the polychloro-alpha-alkylstyrene. Generally the olefinic carbon directly carrying an activating group is attached to hydrogen or methyl.

The preferred resinous compositions are prepared by subjecting to free radical polymerizing conditions en masse, in aqueous suspension or in emulsion a mixture of a polyhalogenated alpha-alkylstyrene having, as above set forth, the 2- and 6-positions free of substituents and one or more other compounds containing a single activated olefine group >C=C< having not in excess of two and preferably not more than one of the four indicated free valences directly connected to the equivalent number of groups selected from —CN, —COOR (where R is hydrogen, alkyl or substituted alkyl), amide, acid anhydride

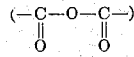

and aryl (including halogenated aryl), and preferably phenyl. These compounds for copolymerization with the aforedesignated nuclearly disubstituted isopropenylbenzenes are further characterized by having remaining free valences connected to hydrogen and/or alkyl (preferably hydrogen and methyl) and by having no single carbon of the olefine group simultaneously connected directly to both aryl and alkyl groups.

The vinyl compounds which copolymerize with the derivatives of alpha-methylstyrene within the above general formula, which have an activity for copolymerization greater than that of vinylidene chloride and which contain a single olefinic double bond in the structural formula

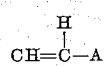

(where A is a radical more electronegative than alkyl) include styrene; the ring halogenated and ring methylated styrenes having up to 4 groups selected from halogen and methyl groups solely on nuclear carbon atoms for example, each of the nuclearly mono-, di- and trichlorinated styrenes such as ortho-chlorostyrene, para-chlorostyrene, 3,4-dichlorostyrene, 3,5-dichlorostyrene, 2,5-dichlorostyrene, 3-methyl-4-chlorostyrene, para-methylstyrene, etc., acrylic acid, its esters and amides, acrylonitrile and vinylpyridine.

The vinylidene compounds which have an activity for copolymerization greater than that of vinylidene chloride, which are found to copolymerize with the same aforesaid derivatives of alpha-methylstyrene have the structure $CH_2=C<$ where at least one of the disconnected valences is connected to a radical more electronegative than alkyl. These compounds include methacrylic acid, its esters such as methyl methacrylate and higher methacrylates and its amides and its nitrile.

Other mono-olefinic compounds also suitable in forming resinous copolymers with the alpha-methylstyrene derivatives of the above general formula include the alpha-beta unsaturated acids, their anhydrides and esters, including maleic and fumaric acids, maleic and fumaric anhydrides and diethyl maleate, etc. and nitriles of chloracrylic acid.

Comonomers such as the allyl maleates, the vinylacetylene, bivinylbenzene, etc., having more than one active aliphatic olefinic group present to provide cross linking agents to obtain infusible and nonthermoplastic resins. Appreciable amounts are generally undesirable except where an in situ casting technique is used.

A conjugated diene such as butadiene 1,3, isoprene, dimethylbutadiene chloroprene, dimethylbutadiene 1,3, piperylene and the like may also be presented to modify the characteristics of the resinous copolymerizable material. The amount of such conjugated diene desirable in resinous compositions should not ordinarily be in excess of 25 per cent by weight of the polymerizable ingredients, although as much as 40 per cent may be present in some instances. Inasmuch as the alpha-methylstyrenes polyhalogenated in the nucleus are exceedingly difficult to homopolymerize, these materials should ordinarily be present in an amount not greatly exceeding 50 mol per cent of the entire polymerizable materials in the mixture to be polymerized unless one desires amounts in excess of 50 mol per cent to plasticize the resinous composition. Some of the excess above 50 mol per cent apparently and surprisingly enters into the copolymer. The comonomer mixture as polymerized should for best results ordinarily contain less than 75 mol per cent of the monomers even though excess is removed later.

Even a relatively small amount, such as 1 to 10 per cent, of the halogenated alpha-alkylstyrenes imparts desirable noticeably improved properties to the polymerization product obtained by polymerizing the mixtures of the monomers. More than 10 per cent, up to 50 or 60 mol per cent give the higher heat distortion copolymers and in most cases about 50 mol per cent gives optimum properties.

The polymerization may be carried out in aqueous emulsion or suspension or en masse with or without the addition of a solvent or diluent and preferably with the aid of a suitable polymerization catalyst, i. e. those capable of forming free radicals, including organic peroxides. If polymerization en masse is used it is preferred to utilize a relatively lower temperature during the first part of the polymerization and a higher temperature at the end of the cycle. An inert atmosphere should be present over the surface of the polymerizable materials to exclude oxygen which acts as an inhibitor.

Polymerization en masse or the so-called pearl or suspension polymerization, wherein the mixture of polymerizable materials with oxidizing catalyst or other free radical initiator is simply agitated in water or solution of a non-surface active protective colloid in a suitable pressure vessel at an ordinary-to-moderately elevated temperature, is ordinarily preferred when a clear resin suitable as a molding powder is desired.

In cases when a water-reactive material such as maleic anhydride is present as one of the monomers, polymerization of the mixed monomers in the absence of water may be required. If a clear resin is not necessary, we prefer to utilize emulsion polymerization wherein the mixture of polymerizable materials is incorporated in an aqueous solution or suspension of a surface active emulsifying agent with or without a protective colloid, and with or without the addition of pigments, plasticizers and the like, for the reason that polymerization may be more rapidly and more conveniently carried out and physical properties of the resultant copolymer are superior. The emulsifying agents may be of the cationic (usually quaternary ammonium compounds) or anionic types.

Examples of suitable emulsifying agents which may be used are set forth in the lists of surface-active agents compiled by F. J. Van Antwerpen, published in Industrial and Engineering Chemistry, January 1939, pages 66 to 69, January 1941, pages 12 to 22, and January 1943, pages 126 to 130. The copolymerization in aqueous solution is greatly facilitated by conducting it in a stirred vessel completely filled with liquid so that there is substantial absence of any vapor-liquid interface for reflux action to occur.

The speed of polymerization may be controlled by addition of suitable activators such as complex salts of cobalt, particularly alkali metal cobaltinitrites and alkali metal aquo hydroxylo nitrite cobaltiate in conjunction with mercaptans such as dodecyl mercaptan, as well as other activators for emulsion polymerization as described in the copending application of John C. Warner and Harry Seltz, Serial No. 687,954, filed August 2, 1946, assigned to the assignee hereof.

The finely divided resinous compositions of the present invention may be molded directly or they may be ground or mixed with a plasticizer and/or solvent (capable of combining therewith at elevated temperature) to form a slurry which may be used as a coating or molding composition, etc. and the thus coated material subjected to heat to cause coalescence of the solid particles and compatibility with plasticizer and remaining solvent. The resin may for example, be ball mill ground in the presence of a plasticizer which is compatible at nondestructive elevated temperatures, preferably diluted with a solvent or thinner such as a drying oil, a hydrocarbon liquid such as kerosene, etc. and used as a coating or dipping composition. If a dispersing agent such as one or more water-insoluble soaps, long chain amines, ink lengthener obtained from still bottom distillation of petroleum during the manufacture of lubricating oils, is present (preferably during part of the grinding operation) a more flowable slurry or dispersion of finely divided resin is produced in said plasticizer. Hot metal articles (heated above 250° C.) dipped into such a dispersion retain relatively heavy layers thereon. After drying and heating the thus coated article to a temperature of about 300° C. or sufficiently to coalesce the dispersed particles, a coherent protective film of surprising strength may be had over the surface of the metal.

The resinous copolymers of the present invention are generally characterized by having a substantially higher heat distortion than have polymers of styrene and copolymers of an identical composition except that the polysubstituted alpha-methylstyrene is substituted by styrene or other monoolefinic materials. The nuclear polyhalogenated alpha-methylstyrene copolymers of the present invention and especially those having halogen such as chlorine in the 3- and 4-positions on the nucleus have another surprising and outstanding feature in that they are found to be resistant to the deteriorating effect of hydrocarbons such as gasoline.

Polystyrene and hydrocarbon copolymers of polystyrene with alpha-methylstyrene and many other styrene derivatives have the undesirable characteristics of rapidly deteriorating when contacted with hydrocarbon liquids, such as gasoline, lubricating oils or solvents. Even as little as may be contained in wax and other dressings with which they might come in contact often cause destruction. Then are also susceptible to absorption of plasticizers such as may be present in vinyl resins and the like. This deterioration is so extensive that a polystyrene article, for example, when contacted for only a few minutes with hydrocarbons will develop cracks and crevices that may extend through the entire article and cause it to disintegrate or to have an unsightly appearance. This fact and the fact that it and most other thermoplastic synthetic resins have a very low A. S. T. M. heat distortion temperature so that articles of these materials cannot be boiled in water without destroying a molded article perhaps constitute the most serious drawbacks to general acceptance of these resins.

The copolymers of the polychlorinated alpha-methylstyrene with styrene and other material have much improved hydrocarbon resistance. The copolymers of 3,4-dichloro-alpha-methylstyrene with styrene, for example are not destroyed by prolonged contact with hydrocarbons. The extreme resistance of the copolymers of 3,4-dichloro-alpha-methylstyrene and other alpha-methylstyrenes containing halogens in the 3- and 4-positions may be explained by study of the molecular structure of the copolymer with styrene. In a model polymer molecule made to show equal moles of 3,4-dichloro-alpha-methylstyrene and styrene, the 3- and 4-chlorines in the copolymer may be seen to be arranged in spiral like fashion that apparently will completely protect the molecule. Also even the 3,5-dichloro-alpha-methylstyrene copolymer is less resistant to deterioration but is much superior of styrene polymers.

The following examples in which parts are by weight, illustrate the present invention:

*Example 1*

|  | Parts |
|---|---|
| Alpha-methyl 3,4-dichlorostyrene | 10 |
| Styrene | 25 |
| Mixture of isomers of dichlorostyrene | 35 |

The above ingredients are polymerized en masse by maintaining a mixture thereof in a suitable closed vessel at a temperature of 60° C. for about one day with the addition of about .1 per cent of monomer soluble peroxide catalyst such as for example benzoyl peroxide. The vessel has an inert atmosphere of $N_2$ over the monomers.

*Example 2*

|  | Parts |
|---|---|
| 3,4-dichloro-alpha-methylstyrene | 50 |
| Mixture of isomers of dichlorostyrene consisting essentially of the 2,4-, the 3,4-, the 2,5- and 3,5-dichloro-isomers | 50 |
| Benzoyl peroxide | 0.5 |

The above ingredients were allowed to stand for 24 hours at 60° C. in a closed tube. A clear, hard, colorless resin of high strength and good electrical properties was produced.

When the amount of dichlorostyrene was increased to provide a 90:10 ratio of the monomers, other conditions remaining the same, a hard resin was also produced.

Example 3

The ingredients of Example 3 were substituted by 50 parts of acrylonitrile, 50 parts of 3,4-dichloro-alpha-methylstyrene, and about 0.5 part of a catalyst (benzoyl peroxide); other conditions remained the same. A hard, pale-yellow resin having high strength and good properties was also produced. The yellow coloration was apparently due to impurities in the acrylonitrile.

Example 4

|   | Parts |
|---|---|
| Maleic anhydride | 49 |
| 3,4-dichloro-alpha-methylstyrene | 93.5 |
| Benzoyl peroxide | 0.5 |

The above ingredients were mixed together and substituted for the ingredients of Example 3, other conditions remaining the same; a strong, hard, clear resin was produced.

Example 5

|   | Parts |
|---|---|
| Styrene | 50 |
| 3,4-dichloro-alpha-methylstyrene | 50 |
| Emulsifying agent (Dresinate No. 731 which is believed to be a sodium soap of hydrogenated rosin) | 4.0 |
| NaOH | 0.1 |
| Catalyst (cumene hydroperoxide) | 0.3 |
| Water | 200 |

The styrene and the dichloro-alpha-methylstyrene were freshly distilled so as to be free from inhibitor. They were first mixed together with the addition of catalyst and the whole emulsified into the alkaline solution of the emulsifying agent and incorporated into a closed polymerization vessel which was so proportioned that the emulsion completely filled the vessel and there was a complete absence of vapor space above the emulsion. The vessel was fitted with a trap and stand pipe filled with aqueous liquid to maintain a slight pressure on the polymerizable ingredients and act as a reservoir to insure the absence of vapor space after contraction of volume occurred as a result of polymerization. The vessel was maintained at 50° C. with constant agitation until polymerization of the polymerizable ingredients was complete. The resultant latex was coagulated with 10 per cent acetic acid, washed with water and the coagulum dried in an oven maintained at 60° C. The dried coagulum was first pelletized and then molded into test bars utilizing injection molding technique and injection mold pressure of 10,000 to 30,000 p. s. i. and injection mold temperature of from 475 to 500° F. The resultant casting had the following properties: specific volume 25.6 cubic inches per pound; a specific gravity 1.080; castings had tensile strength of 6,000 to 8,000 p. s. i.; flexural strength 9,500 to 12,000 p. s. i.; impact strength 0.3 to 0.4 foot pounds per inch of notch; hardness (Rockwell—M) 110; A. S. T. M. heat distortion 120° C.; di-electric constant ($10^6$ cycles) 0.0006; water absorption (24 hours) 0.01 per cent; an amber transparent color; and an absence of crazing or cracking when contacted with aliphatic carbons such as a lubricating oil, gasoline and the like.

When the 3,4-dichloro-alpha-methylstyrene is reduced to as little as 1 or 2 per cent a thermoplastic resin having properties somewhat superior to those of polystyrene is still obtained.

Example 6

An equal number of parts of methyl-methacrylate was substituted for the styrene in Example 5, other conditions remaining the same, the resultant dry polymer when molded had an A. S. T. M. heat distortion of over 120° C., a high impact strength and a very high tensile and flexural strength indicating the resulting resin to have exceptionally desirable characteristics. Then only one half of the styrene in Example 5 was replaced by 25 parts of methacrylate, other conditions remaining the same, an exceptionally desirable resin having a high heat distortion was also produced.

Example 7

50 parts of 3,4-dichloro-alpha-methylstyrene and 50 parts of methyl methacrylate and 0.1 part of benzoyl peroxide, the above ingredients were mixed together and placed in a closed vessel having atmosphere of $N_2$ over the surface of the polymerizable liquid. They were polymerized en masse by heating at 80° C. for 24 hours. The temperature was gradually raised until a temperature of 140° C. was reached about 24 hours later. The resultant copolymer was crystal clear, had high hardness and was very tough.

Example 8

|   | Parts |
|---|---|
| Dinvinyl benzene (containing about 60 per cent ethylstyrene) | 50 |
| 3,4-dichloro-alpha-methylstyrene | 50 |
| Benzoyl peroxide | 0.5 |

A mixture of the ingredients was heated en masse at 150° C. to form a hard resin.

Example 9

|   | Parts |
|---|---|
| 3,4-dichloro-alpha-methylstyrene | about 50 |
| Di-isobutyl acrylamide | about 50 |
| Benzoyl peroxide | about 0.5 |

A mixture of the above ingredients was heated at 150° C. within an inert oxygen free atmosphere in contact therewith for about 24 hours to form a hard resin.

The unobviousness of the properties conferred on an organic compound having as complex a molecule as styrene by simply forming a next higher homologue is also illustrated by the effect of adding a methyl group to para-chloro-alpha-methylstyrene and to meta-chloro-alpha-methylstyrene.

There are three possible isomers of para-chloro-alpha-methylstyrene (4-chloroisopropenylbenzene) which would if the formerly held old idea concerning the next higher homologue, is about identical. The methyl group may be substituted on the number 2 or number 3 carbons of the ring or on the beta carbon of the isopropenyl group. Only when the methyl group is substituted in the 3-position does the resultant next higher homologue copolymerize with styrene and the other mono-olefines herein set forth.

Similarly there are five possible isomers of 3-chloro-alpha-methylstyrene (3-chloroisopropenylbenzene) yet when the methyl group is added to any of the 2-, 6- or beta positions the resultant next higher homologue of 3-chloroisopropenylbenzene fails to copolymerize with mono-olefines such as styrene methylmethacrylate, etc. as herein set forth. When it is substituted at the 4- or 5-positions the product is found to copolymerize with their same mono-olefines using the same procedure as before attempted except that the next higher homologue of para-chloro-alpha-methylstyrene is different. A similar difference in properties is shown by the next higher homologues of para-methyl-alpha-methylstyrene.

The concept of an homologous series would indicate that all five of the isomeric next higher homologues of meta-chloro-alpha-methylstyrene and all of the isomeric next higher homologues of para-chloro and para-methyl-alpha-methylstyrenes to be the same. These differences are illustrated by the following Examples 10 and 10A hereof.

*Example 10*

The 3,4-dichloro-alpha-methylstyrene of Example 5 is substituted by an equal weight of 3-chloro-4-methyl-alpha-methylstyrene, other conditions and ingredients remaining the same, the copolymer produced in about 100 per cent yield and has an A. S. T. M. heat distortion point of about 109° C. and has extremely good physical properties. When the 4-chloro-3-methyl-alpha-methylstyrene is substituted for the 3,4-dichloro-alpha methylstyrene in Example 5 a resin having desirable properties is also obtained in good yield.

*Example 10A*

The 3-chloro-4-methyl-alpha-methylstyrene of Example 10 is substituted successively by 2-methyl-3-chloro-6-methyl-3-chloro and the beta methyl-3-chloro, other conditions remaining the same. The resinous material which is obtained in each case in low yield when analyzed fails to show any combined chlorine.

The 3-chloro-4-methyl-alpha-methylstyrene of Example 10 is also successively substituted by an equal weight of 2-methyl-4-chloro and beta-methyl - 4 - chloro - alpha - methyl - styrene, other conditions remaining the same. The resinous material obtained in each of these cases in low yield also shows, when analyzed, no noticeable amount of combined chlorine. This conclusively shows that two of the three next higher homologues of para-chloro-alpha-methyl-styrene, and three of the five next higher homologues of meta-chloro-alpha-methylstyrene do not form copolymers with styrene by the free radical mechanism. When styrene in Example 10A is substituted by other mono-olefines, it is also found that copolymers are not formed.

The following examples further illustrate the present invention:

*Example 11*

The styrene in Example 5 is substituted by 3,5-dichloro-alpha-methylstyrene, other conditions remaining substantially the same, except that the reaction is permitted to proceed for a longer time, the resinous copolymer obtained in good yield has an extremely high softening point. The resinous copolymer is soluble in aromatic solvent mixtures and has, because of the extremely high softening point, exceptionally desirable properties for the preparation of printing inks suitable for modern high speed presses. The copolymerization of these materials is indeed surprising as neither homopolymerized and it was assumed that the alpha-methyl group prevented two such molecules from getting together.

*Example 12*

When styrene in Example 5 is substituted by an equal weight of mixed isomers of dichlorostyrene, an excellent hard resin having outstanding properties is also produced.

*Example 13*

|   | Parts |
|---|---|
| 1 - isopropenyl - 3,4 - dichlorobenzene | 25 |
| 1 - isopropenyl - 4 - chlorobenzene | 25 |
| 1 - vinyl - 4 - chlorobenzene | 50 |
| Benzoyl peroxide | 1 |

The above materials are dispersed in water containing some polyvinyl alcohol as a stabilizing agent under constant agitation at about 50° C. and agitation continued until polymerization is complete. The resin produced is highly desirable for preparation of electrical insulators and the like.

In the preceding examples the 3,4-dichloro-alpha-methylstyrene may be substituted in whole or in part by any one or more 3,4- and 3,5-disubstituted - alpha - methylstyrenes as included in the aforementioned general formula. The styrene of Example 5 and/or comonomers in the above Example 5 and the methyl methacrylate in Example 6 may be substituted in whole or in part by any one or more of the mono-olefinic monomers previously mentioned as polymerizable with nuclear poly-substituted alpha-methylstyrenes. It is again emphasized that the 3,4-dichloro-alpha-methylstyrene and the 3,4-disubstituted alpha-methylstyrenes in general having halogen or especially chlorine in at least one of the 3 or 4 positions produce copolymers having outstanding properties. While the corresponding bromine and iodine derivatives produce resins suitable for many commercial applications, products containing fluorine and chlorine in the nucleus are usually preferred. The catalysts, activators, etc., may be substituted for other free radical catalysts. The temperature of polymerization may be varied as is evident from those skilled in the art. When the olefinic group in the comonomer is activated by chlorine or by an acetate group such as is present in the vinylchlorine, and vinyl acetate, desirable copolymers are obtained when there is present a sufficient third monomer to copolymerize with the chlorine or acetate activated mono-olefine.

The following example is given to further illustrate the selective copolymerization of the 3,4-dichloro-alpha-methylstyrene. The 50 parts of 3,4 - dichloro-alpha-methylstyrene were successively mixed with 50 parts of each of the monomers shown in the following table and emulsified in 180 parts of water containing 5 percent of soap (Na stearate) and 3 parts of sodium persulfate, the emulsion was treated as in Example 5 and the polymerization was carried out at 50° C. The materials were maintained in this temperature for two weeks. The yield, melting point, percentage of bound chlorine in the copolymer and the ratio of monomers in the final polymer as indicated by the percentage of chlorine is shown in the following table:

| Monomer | Percent Yield | M. P., °C. | Percent Chlorine | * |
|---|---|---|---|---|
| 1. Alpha-methylstyrene | 0 | | | |
| 2. m-chloro-alpha-methylstyrene | 54 | 195 | 26.87 | 1:4 |
| 3. p-chloro-alpha-methylstyrene | 56 | 195 | 26.37 | 1:4 |
| 4. p-methyl-alpha-methylstyrene | 46 | 185 | 17.13 | 1:1.7 |

\* Shows the percentage of monomers as calculated from bound chlorine in the copolymer.

The above shows that fact that there is something more than steric considerations that render the homo-polymerization of the alpha-methylstyrene derivatives unfeasible. It also illustrates the fact that there must be more than steric considerations that determine the copolymerizability of the various monomeric materials.

3,4-dichloro-alpha-methylstyrene may, as aforesaid, be rapidly homo-polymerized and copolymerized with styrene and isobutylene in wide ranges by bubbling boron fluoride or its ether complex thru solution of these monomers in cold liquid ethylene for example.

As used herein, the term "interpolymerization product of a polyhalogenated alpha-alkylstyrene having the nuclear carbon atoms adjacent that carrying the vinyl group free of chlorine" designates copolymers, interpolymers and materials otherwise named, which may be obtained by polymerizing together such a polyhalongenated alpha-alkylstyrene and one or more of the monomers of other polymerizable materials, such as those aforementioned, and containing less than 45 percent (preferably less than 20 per cent) by weight of any conjugated diene.

Since after the formation of a copolymerization product of a conjugated diene and one or more monomers, the conjugated diene is not present in the copolymer as a conjugated diene but rather as a unit of the following formula

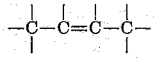

it may be considered improper to say that the polymer contains any conjugated diene, hence in the appended claims the term "residue from the interpolymerization of a conjugated diene" has been used to designate that portion of the conjugated diene which has entered into the polymer. It has the probable general formula

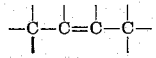

rather than the formula

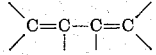

Similarly the residue of 3,4-dichloro-alpha-methylstyrene has the probable chemical formula

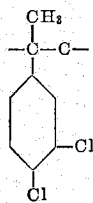

where the free valances are connected to other residues from polymerization of the same or other monomers. It is therefore seen that the term "residue from polymerization of a monomer" designates that portion of the monomer molecules in the polymer.

The terms "an acrylonitrile" and "an acrylic acid" are used in the generic sense to respectively designate both acrylic and methacrylic nitriles are both acrylic and methacrylic acids.

In the appended claims the term "activity for copolymerization" or "monomer reactivity for copolymerization" are considered to be the Q value set forth in the article of Charles Price entitled "Some relative monomer reactivity factors" and appearing in the Journal of Polymer Science, vol. 5, pages 772 to 775.

Although several embodiments of the invention have been herein shown and described, it will be understood that in accordance with the provisions of the patent statutes modifications may be made without departing from the spirit thereof and it is intended that the invention be limited only by the appended claims.

We claim:

1. A resinous interpolymerization product comprising in copolymerized form (1) at least one isopropenyl benzene of not in excess of ten carbon atoms and consisting of carbon, hydrogen and chlorine, all of said chlorine being attached to a nuclear carbon atom, said isopropenyl benzene having only two substituents both of which are attached directly to nuclear carbons said isopropenyl benzene being further characterized by having both of the nuclear carbon atoms next adjacent that directly carrying the isopropenyl group connected to hydrogen and (2) at least one polymerizable mono-olefinic compound having no atoms other than C, H, N, Cl, Br and O in the molecule in which the olefinic group is directly connected to a radical more electronegative than alkyl, said radical being selected from the group consisting of —CN, acid anhydride, aryl, amide pyridyl, and —COOR groups where "R" is selected from the group consisting of hydrogen, alkyl, and substituted alkyl, said interpolymerization product comprising not in excess of 25 per cent by weight thereof of a conjugated di-olefinic compound.

2. The interpolymerization product of claim 1 further characterized in that one of the carbon atoms of said olefinic group of said polymerizable mono-olefinic compound is connected to two hydrogen atoms.

3. The interpolymer according to claim 1 in which both of said nuclear substituents in said alpha-methylstyrene are in the 3- and 4-positions.

4. A resinous interpolymer according to claim 1 in which at least part of said isopropenyl benzene is 3,4-dichloro-alpha-methylstyrene and where at least part of the said polymerizable mono-olefinic compound is styrene.

5. A resinous interpolymerization product of a liquid mixture comprising 3,4-dichloro-alpha-methylstyrene and styrene, said interpolymerization comprising not in excess of 25 per cent by weight of the residue from the copolymerization of a conjugated di-olefinic compound.

6. A resinous interpolymerization product comprising 3,4-dichloro-alpha-methylstyrene and methyl methacrylate.

7. A resinous interpolymerization product of a liquid mixture comprising 3,4-dichloro-alpha-methylstyrene and an aryl vinyl compound, said interpolymerization comprising not in excess of 25 per cent by weight thereof of the residue from polymerization of a conjugated di-olefinic compound.

8. A resinous interpolymerization product of a liquid mixture comprising 3,4-dichloro-alpha-methylstyrene and an acrylonitrile.

9. A resinous interpolymerization product of a liquid comprising 3,4-dichloro-alpha-methylstyrene and an ester of an acrylic acid, said interpolymerization product comprising not in excess of 25 per cent by weight thereof of a conjugated di-olefinic compound in combined form.

10. An interpolymerization product of styrene and a polyhalogenated alpha-methylstyrene having the nuclear carbon atoms adjacent the carrying vinyl group connected to hydrogen, said styrene and said polyhalogenated alpha-methylstyrene constituting at least 60 per cent of the components, and said polyhalogenated alpha-methylstyrene forming about 1 to about 50 mol per cent of the total components of said product.

11. The process which comprises copolymerizing in aqueous emulsion a 3,4-dichloro-alpha-methylstyrene and a compound having no atoms other than C, H, N, Cl, Br and O in the molecule containing a single olefinic group of the general formula >C=C< and having at least one of the four free valences thereof directly connected to a member of the group consisting of aryl, acid anhydride, —CN, amide, pyridyl and —COOR groups in which "R" is selected from the group consisting of hydrogen, alkyl, aryl, and substituted alkyl, said compounds being further designated by having no single carbon atom of the olefinic group simultaneously connected directly to both aryl and alkyl groups, the residue of 3,4-dichloro-alpha-methylstyrene in said mixture being 1 to 50 mol per cent of the residues of all polymerizable monomers after the completion of the polymerization of polymerizable ingredients in said mixture.

12. The process of claim 11 wherein the polymerization is conducted in the presence of a continuous phase of aqueous liquid.

13. A resinous interpolymerization product comprising a nuclearly-dihalogenated alpha-alkylarylvinyl compound having the nuclear carbon atom next adjacent that carrying the vinyl group connected to hydrogen, and a compound containing the group $H_2C=C<$ and having one of the free valences connected to a —CN group and another free valence attached to a group selected from hydrogen and a lower alkyl, the residue from said nuclearly dihalogenated alpha-alkylarylvinyl compound being 1 to 50 mol per cent of the total residues of monomers in said interpolymerization product.

14. A method of producing a resinous interpolymerization product which comprises mixing a dichloro-alpha-methylstyrene having the carbon atoms next adjacent that carbon atom which directly carries the isopropenyl group connected to hydrogen, a polymerizable mono-olefinic compound having no atoms other than C, H, N, Cl, Br and O in the molecule and having one of the free valences of the group, >C=C<, directly connected to a phenyl group and having the remaining valences connected to hydrogen, contacting the mixture thus formed with a free radical forming catalyst and allowing the mixture to thicken to the resinous state, the residue from said dichloro-alpha-methylstyrene in said mixture being 1 to 50 mol percent of the residues of all polymerizable monomers in said mixture.

15. A method of producing a resinous interpolymerization product which comprises mixing with a dichloro-alpha-methylstyrene having the carbon atoms that are next adjacent the carbon atom which directly carries the isopropenyl group connected to hydrogen, a mono-olefinic compound having no atoms other than C, H, N, Cl, Br and O in the molecule and having one of the free valences of the olefinic group, >C=C<, directly connected to a phenyl group and having the remaining valences connected to hydrogen, distributing the mixture thus formed through a continuous phase of water and maintaining the polymerizable ingredients in said water until they are transformed into the solid state, the residue from said dichloro-alpha-methylstyrene in said mixture being 1 to 50 mol per cent of the residues of all polymerizable monomers in said mixture.

16. Method of preparing a resinous polymerization product which comprises mixing (1) isopropenyl benzene having a plurality of substituents, all of which are in the nucleus and none of which are in the 2- and 6-positions, all of said substituents being nitrogen and oxygen free and being mono-valent ortho-para directing groups which have less than two carbon atoms which do not appreciably activate the benzene ring and which have less than two carbon atoms and have an atomic weight of less than 36, and (2) a polymerizable mono-olefinic compound having no atoms other than C, H, N, Cl, Br and O in the molecule and having attached directly to one of the carbon atoms of said olefinic group a non-halogen containing group more electronegative than alkyl, which non-halogen containing group is selected from the group consisting of aryl, acid anhydride, —CN, amide, pyridyl and —COOR in which "R" is selected from the group consisting of alkyl, hydrogen, aryl, and substituted alkyl groups, subjecting said mixture to a suitable catalyst in the presence of a continuous phase of aqueous liquid until a solid product is produced.

17. A resinous interpolymerization product comprising in copolymerized form (1) at least one isopropenyl benzene of not in excess of ten carbon atoms and consisting of carbon, hydrogen and chlorine, all of said chlorine being attached to a nuclear carbon atom, said isopropenyl benzene having only two substituents both of which are attached directly to nuclear carbons, said isopropenyl benzene being further characterized by having both of the nuclear carbon atoms next adjacent that directly carrying the isopropenyl group connected to hydrogen, and (2) at least one polymerizable mono-olefinic compound having no atoms other than C, H, N, Cl, Br and O in the molecule in which the olefinic group is directly connected to a radical more electronegative than alkyl, said radical being selected from the group consisting of —CN, acid anhydride, aryl, amide pyridyl, and —COOR groups where "R" is selected from the group consisting of hydrogen, alkyl, and substituted alkyl.

18. The method of preparing a resinous polymerization product which comprises reacting in the presence of a suitable catalyst (1) isopropenyl benzene of not in excess of ten carbon atoms and consisting of carbon, hydrogen and chlorine and having a plurality of substituents, all of which are in the nucleus and none of which are in the 2- and 6-positions, at least one of said substituents being chlorine, and (2) at least one polymerizable mono-olefinic compound having no atoms other than C, H, N, Cl, Br and O in the molecule in which the olefinic group is directly connected to a radical more electro-negative than alkyl, said radical being selected from the group consisting of —CN, acid anhydride, aryl, amide pyridyl, and —COOR groups where "R" is selected from the group consisting of hydrogen, alkyl and substitute alkyl, said interpolymerization product comprising not in excess of 25 per cent by weight thereof of a conjugated diolefinic compound and subjecting said mixture to a suitable catalyst until a solid product is produced.

19. The method of claim 18 in which the catalyst is a free radical forming catalyst and in which the mixture is incorporated into a continuous phase of water and is maintained in dispersed condition in said water until polymerization to a solid state occurs.

20. The method of claim 18 in which isopropenyl benzenes are present in a total amount not appreciably in excess of 60 mol percent of the total polymerizable ingredients and in which the mixture is free from more than 25 per cent of a conjugated diolefinic compound.

21. A resinous interpolymerization product of a mixture comprising (1) an isopropenyl benzene having a plurality of substituents, all of which are in the nucleus and none of which substituents are in the 2- or 6-positions, all of said substituents being nitrogen and oxygen free and being mono-valent ortho-para directing groups which have no more than one carbon atom and have a total atomic weight of less than 36 and (2) at least one polymerizable mono-olefinic compound having no atoms other than C, H, N, Cl, Br and O in the molecule in which the olefinic group is directly connected to a radical more electronegative than alkyl, said radical being selected from the group consisting of —CN, acid anhydride, aryl, amide pyridyl, and —COOR groups where "R" is selected from the group consisting of hydrogen, alkyl, and substituted alkyl, said interpolymerization product comprising not in excess of 25 per cent by weight thereof of a conjugated diolefinic compound.

THEODORE A. TE GROTENHUIS.
GILBERT H. SWART.

References Cited in the file of this patent

UNITED STATES PATENTS

| Number | Name | Date |
|---|---|---|
| 2,406,319 | Brooks et al. | Aug. 27, 1946 |
| 2,473,985 | Brooks | June 21, 1949 |
| 2,548,504 | Te Grotenhuis et al. | Apr. 10, 1951 |

OTHER REFERENCES

Bachman et al.: J. A. C. S., vol. 69, August 1947, pages 2022–2025.